United States Patent [19]

Crotts et al.

[11] Patent Number: 4,865,058

[45] Date of Patent: Sep. 12, 1989

[54] ROLL OVER VEHICLE WASHING APPARATUS WITH HIGH AND LOW PRESSURE SPRAY SYSTEMS

[75] Inventors: Lonnie M. Crotts, Greensboro, N.C.; William W. Rambo, Keeling, Va.

[73] Assignee: Bivens Winchester Corporation, Danville, Va.

[21] Appl. No.: 255,857

[22] Filed: Oct. 11, 1988

[51] Int. Cl.$^4$ ............................................. B60S 3/04
[52] U.S. Cl. ................................. 134/45; 134/57 R; 134/123; 134/181
[58] Field of Search ............... 134/45, 57 R, 123, 172, 134/180, 181; 15/DIG. 2

[56] References Cited

U.S. PATENT DOCUMENTS

| | | | |
|---|---|---|---|
| 2,708,446 | 5/1955 | Phillips | 134/180 X |
| 2,788,009 | 4/1957 | Lones | 134/123 X |
| 3,072,130 | 1/1963 | Grabenhorst | 15/DIG. 2 |
| 3,339,563 | 9/1967 | Ordonez | 134/123 X |
| 3,368,572 | 2/1968 | Capra | 134/123 |
| 3,570,502 | 3/1971 | Farnsworth et al. | 134/123 X |
| 4,178,948 | 12/1979 | Swinehart | 134/45 |
| 4,718,439 | 1/1988 | Gorra et al. | 134/123 X |
| 4,777,688 | 10/1983 | Seamster, Jr. | 15/DIG. 2 |
| 4,794,938 | 1/1989 | Petit | 134/123 X |
| 4,798,217 | 1/1989 | Hanna | 134/123 X |

*Primary Examiner*—Philip R. Coe
*Attorney, Agent, or Firm*—Krass & Young

[57] ABSTRACT

A roll-over high-pressure washer for non-contact washing of stationary vehicles. A gantry frame having two independent U-shaped spray arms is mounted to roll back and forth over the vehicle, while independent low- and high-pressure spray systems mounted on each of the U-shaped spray arms pre-soak, wash and rinse the vehicle in a preprogrammed sequence. The U-shaped spray arms are maintained in close proximity to the upper surfaces of the vehicle, without contacting them, by primary non-vehicle-contacting and secondary vehicle-contacting sensing means. Side spray arms are also mounted on the gantry frame to wash the side surfaces of the vehicle.

21 Claims, 4 Drawing Sheets

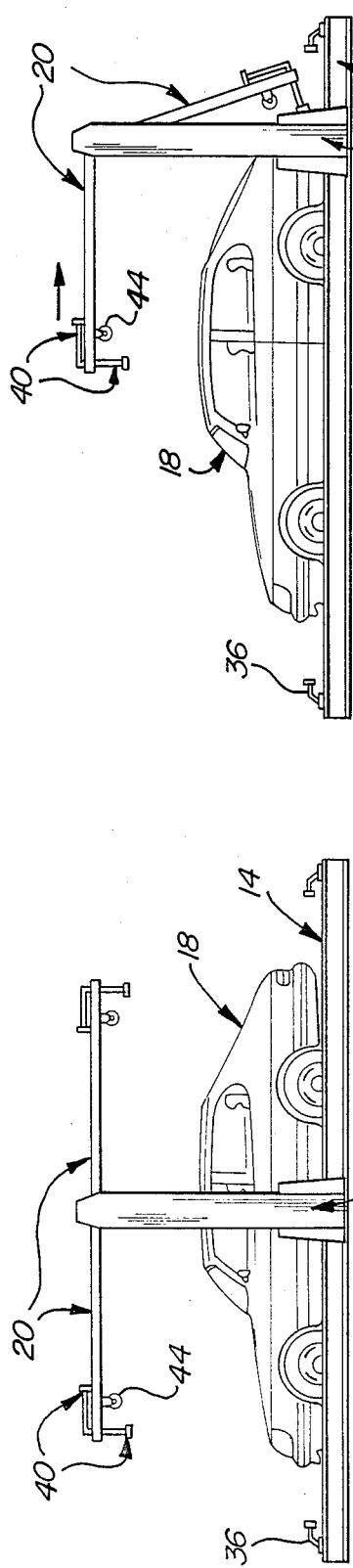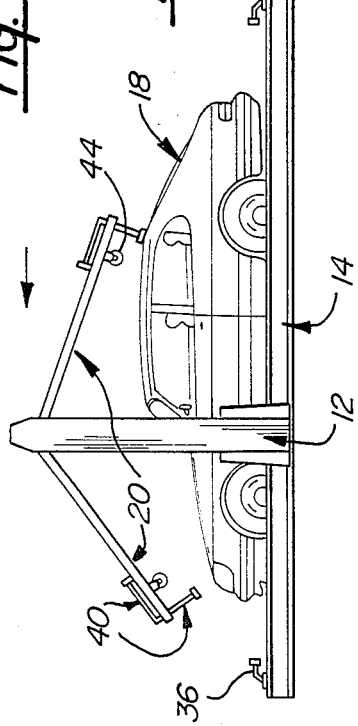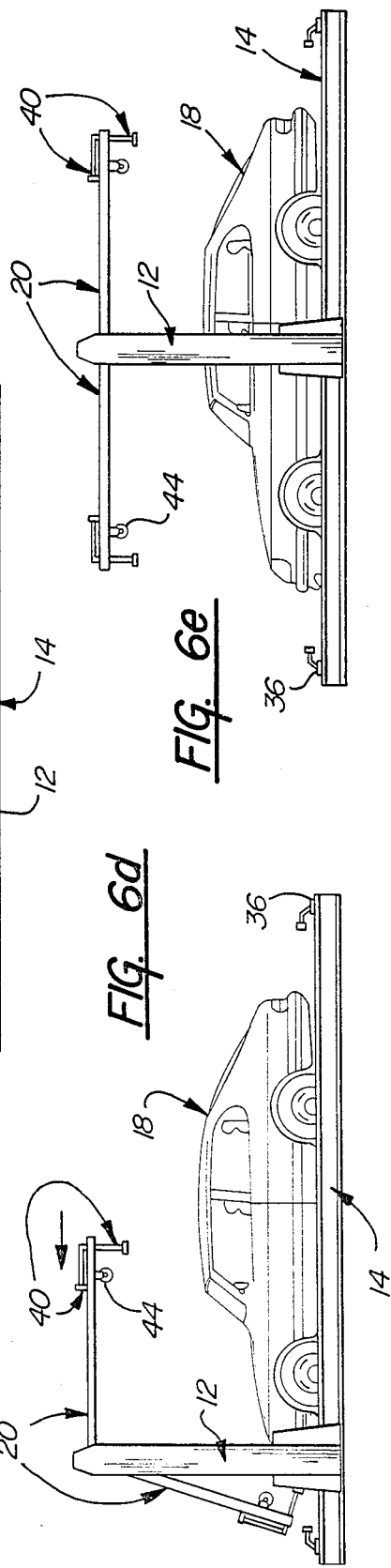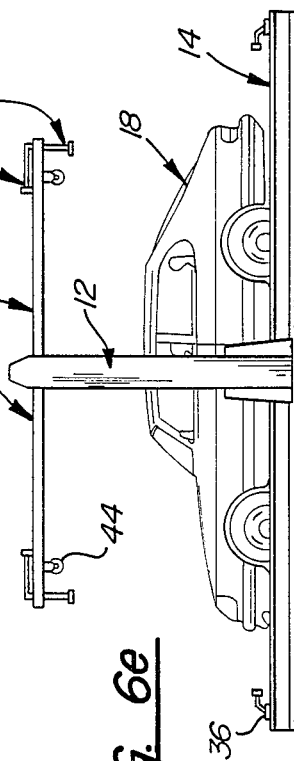
FIG. 6a  FIG. 6b  FIG. 6c  FIG. 6d  FIG. 6e

4,865,058

ROLL OVER VEHICLE WASHING APPARATUS WITH HIGH AND LOW PRESSURE SPRAY SYSTEMS

TECHNICAL FIELD OF THE INVENTION

The present invention relates generally to non-contact vehicle washers; i.e.; a vehicle washer having no brushes or cloth strips to physically engage the vehicle. The invention relates more particularly to a two-arm, high-pressure roll-over washer.

BACKGROUND OF THE INVENTION

Vehicle washers typically employ rotating brushes or depending cloth strips to clean the vehicle by direct physical contact; see for example U.S. Pat. Nos. 3,812,550, 4,118,820 and 4,470,167, all assigned to Bivens Winchester Corporation of Danville, Va. The brushes typically consist of long plastic strands or bristles which are extended radially outwardly by centrifugal force as the brush rotates. Such vehicle washers have been and still are very popular throughout the United States and in many foreign countries.

It is also well known to wash vehicles by non-contacting apparatus; i.e., apparatus which removes surface dirt by directing a stream of high-pressure fluid at the vehicle. Both robotic devices and hand-held wands have been used for this purpose.

Although many people prefer the non-contacting concept of high-pressure washers, they have found that prior art commercial and home systems have not produced entirely satisfactory results; i.e., pressure systems have simply not proven as effective as brush systems in removing dirt.

On the other hand, pressure washers have advantages over brush systems. Because they do not have direct contact with the vehicle, spray systems cannot mar the vehicle's surface or damage surface projections such as mirrors and antennae. Also, the spray conforms itself to the contours of a vehicle and can penetrate narrow crevices effectively.

SUMMARY OF THE INVENTION

The present invention provides a high-pressure washer which retains the inherent advantages of non-contacting systems, but which substantially improves on washing performance and provides this performance in a form which is especially adapted for high-volume, commercial operations and which requires very little space, as compared to a conventional tunnel washer.

In general, this is accomplished in a roll-over type washer including a gantry frame mounted on tracks to move fore-and-aft over a parked vehicle, and a pair of arms pivotally mounted to the gantry frame near the top and extending outwardly therefrom in opposite directions. The arms carry nozzles for spraying the vehicle and are programmed to move up and down, through respective arcs, relative to the vehicle, as the gantry moves fore-and-aft, thereby to maintain close proximity to the vehicle surfaces for maximum effectiveness and to provide full coverage of the vehicle over the top, along the hood and trunk and down to the bumpers and below.

In a preferred embodiment hereinafter described, a number of further features are provided. The side surfaces of the vehicle are washed by essentially depending side arms carrying spray nozzles, one of the side arms being fixed in position to the gantry frame and the other being movable in and out transversely of the frame to accommodate vehicles of different width.

According to another feature of the invention, each of the spray arms carries two independent spray systems, one for low-pressure operation and one for high-pressure operation. The low pressure system is used for pre-soak while the high-pressure system is used for washing and rinsing. Each system has its own nozzles and spray rates which are appropriate to its operation.

According to another feature of the invention, the pivoted horizontal arms are counterweighted and pneumatically position-controlled, with fail-safe return to a full up position. The cylinders of the pneumatic system (which can alternatively be oil or other fluid) are controlled by an electric eye system which looks across the vehicle and which is backed up by a contact wheel. Accordingly, the arms are accurately positioned for close and effective spray proximity while, at the same time, providing safety in operation for vehicle damage guidance.

BRIEF SUMMARY OF THE DRAWINGS

FIG. 6 comprises five side views of the embodiment of FIGS. 1-5 in different stages of washing a vehicle.

DETAILED DESCRIPTION OF THE DRAWINGS

Figure 1:
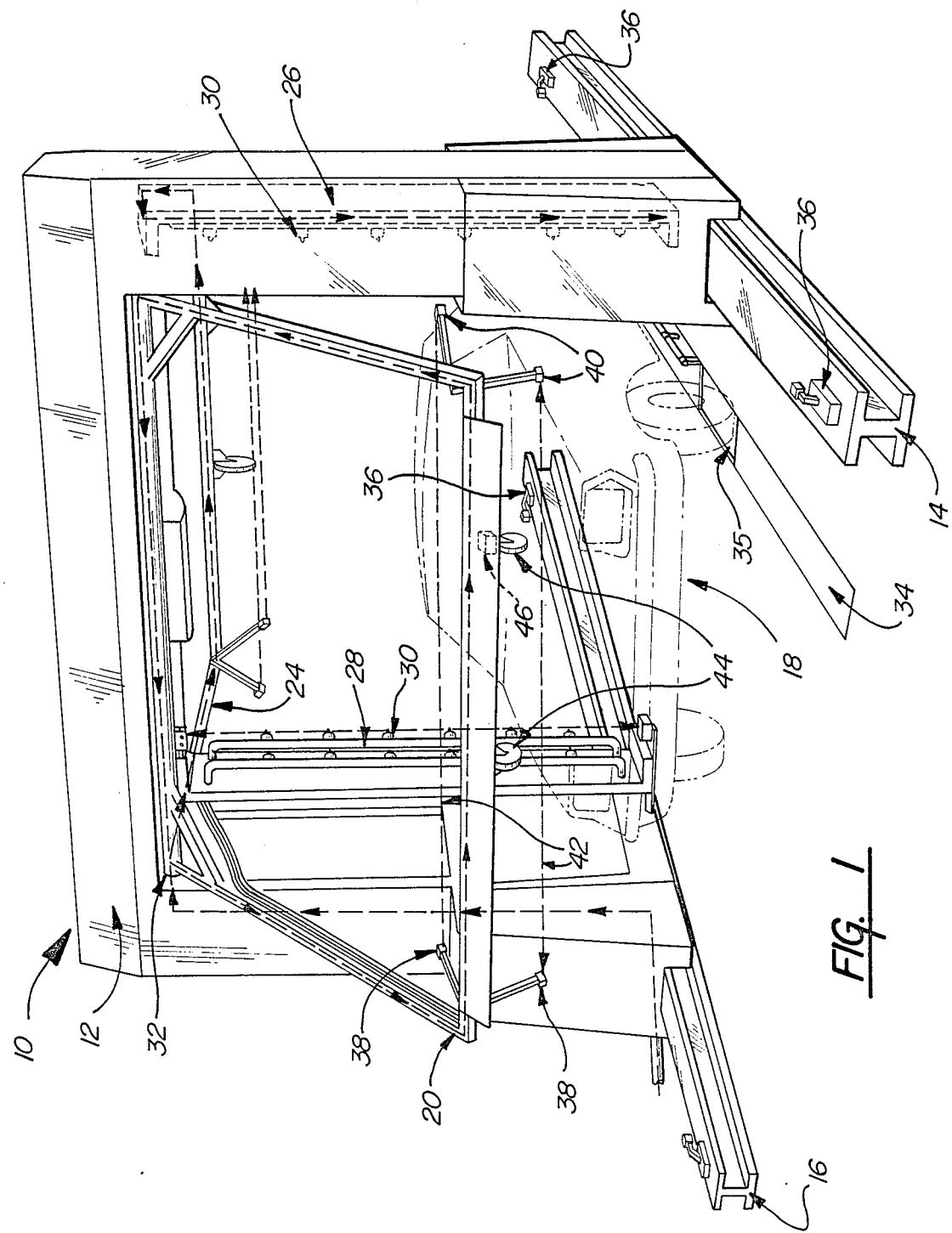
FIG. 1 is a perspective view of a roll-over washer according to the present invention relative to a stationary vehicle.

FIG. 1 shows a roll-over washer 10 to include an inverted U-shaped gantry frame 12 mounted for fore and aft movement on spaced parallel steel rails 14 and 16 over a stationary vehicle 18. Front and rear U-shaped spray arms 20 and 24 are pivotally mounted to the gantry frame 12 near the top center and carry spray tubes 21 having a plurality of spray nozzles 22 to pre-soak, wash and rinse the front, upper, and rear surfaces of the vehicle 18 according to a sequence of operation to be later described.

The U-shaped spray arms 20,24 are connected to the top center of gantry frame 12 to pivot about axes running transverse to the direction of movement of gantry frame 12. Each U-shaped spray arm is pivotal independently of the other between an up position in which it lies in a plane substantially parallel to the ground away from vehicle 18, and a down position in which it is nearly perpendicular to the ground and in close proximity to the end surface of vehicle 18. Suitable programmable drive means (not shown) mounted on or in gantry frame 12 are operable to independently adjust the U-shaped spray arms 20 and 24 through respective arcs between said up and down positions.

To wash the side surfaces of vehicle 18 a pair of substantially vertical side spray arms 26 and 28 are mounted on gantry frame 12, one side spray arm mounted on each vertical support portion of gantry frame 12 adjacent the vehicle 18. Side spray arms 26 and 28 are provided with spray tubes 29 having side spray nozzles 30 facing the sides of vehicle 18 in a substantially perpendicular manner. Side spray arms 26 and 28 and nozzles 30 operate with the U-shaped spray arms 20 and 24 and nozzles 22 to pre-soak, wash and rinse the vehicle 18.

To provide for thorough cleaning of both sides of vehicles having different widths, i.e., to maintain the nozzles 30 of each side spray arm 26 and 28 equidistant from their respective sides of vehicle 18, first side spray arm 26 is fixed relative to gantry frame 12 while second side spray arm 28 is mounted to the other side of gantry frame 12 to be transversely movable relative to the fore and aft travel of gantry frame 12 toward and away from vehicle 18. The vehicle 18 is positioned by a tire guide 34 and treadle 35, mounted in the floor and spaced a predetermined distance from and parallel to rail 14, such that the side of vehicle 18 adjacent fixed side spray arm 26 is located at a substantial constant distance from side spray arm 26, regardless of the width of the vehicle. After vehicle 18 has been driven into tire guide 34 and parked on treadle 35 with one side at a set distance from side spray arm 26, transversely movable side spray arm 28 is moved into position adjacent the opposite side of vehicle 18 at a distance equal to that between fixed side spray arm 26 and the first side of the vehicle. The transverse adjustment and positioning of movable side spray arm 28 is effected by suitable drive and sensor means to be hereinafter described in greater detail.

The gantry frame 12, mounted for fore and aft movement on rails 14 and 16, is initially positioned relative to vehicle 18 by programmable drive means (not shown) mounted on or in gantry frame 12. The limits of fore and aft movement of gantry frame 12 on the rails 14 and 16 are defined by limit switches 36, one mounted near each end of each rail. Contact with limit switches 36 causes gantry frame 12 to either stop or reverse direction, depending on the programmed sequence of operations.

U-shaped spray arms 20 and 24 are provided with both non-vehicle-contacting and vehicle-contacting sensor means to prevent contact between the spray arms 20 and 24 or nozzles 22 and vehicle 18. The non-vehicle-contacting means comprises in the illustrative embodiment a plurality of infrared beam emitters 38 with matching receivers 40, mounted near the lower corners of U-shaped spray arms 20 and 24 essentially in the plane of movement of the side portion of each U-shaped spray arm. A sensor beam 42 is generated between each emitter 38 and receiver 40, the beam 42 transverse to the fore and aft motion of gantry frame 12.

The vehicle-contacting sensor means comprises a sensor wheel 44 mounted on the nozzle carrying portion of each U-shaped spray arm 20,24 and connected to a limit switch 46 which senses pressure in two directions. Wheel 44 is merely a back-up device, as it is generally preferred to avoid all contact with the vehicle surface. Accordingly, wheel 44 is mounted radially inwardly of sensor beams 42 such that it only contacts vehicle 18 in case of failure of the sensor beams to properly position the U-shaped spray arms 20 and 24.

Figure 2:
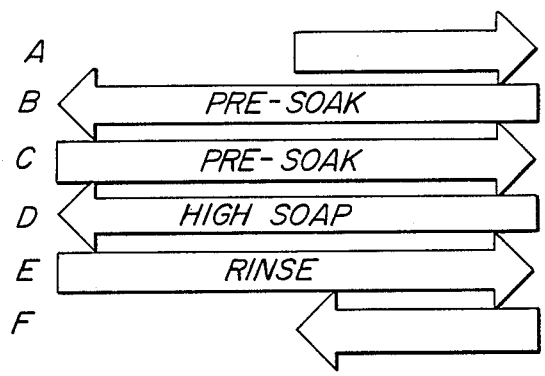
FIG. 2 illustrates in block diagram the movement program for the gantry frame of FIG. 1.

Referring now to FIG. 2, the sequential operation of roll-over washer 10 is shown in an arrow diagram. Gantry frame 12 begins in a home position approximately half way between the ends of rails 14 and 16, with the U-shaped spray arms in their up positions away from the vehicle. When the vehicle is parked, gantry frame 12 travels rearwardly as shown in arrow A to the limit switches adjacent the rear of the vehicle, and the U-shaped upper spray arms and movable side spray arm are moved into proper position with respect to the vehicle. In the pre-soak phase, denoted by arrows B and C, gantry frame 12 travels forwardly over the vehicle to the forward limit switches, and then reverses itself and travels back to the rear limit switches, spraying the vehicle with a heated, low-pressure pre-soak solution to emulsify dirt and grime on the vehicle surface. At the end of the pre-soak phase, gantry frame 12 reverses and travels forwardly again in the high-pressure wash phase represented by arrow D, in which the emulsified dirt is washed off the vehicle by a high-pressure soap spray. The gantry frame only traverses the length of the vehicle once in the high-pressure was phase, reversing itself again at the forward limit switches and entering the high-pressure rinse phase represented by arrows D and E. The gantry frame travels all the way to the rear of the vehicle and then back to the home position, rinsing soap from the vehicle with a high-pressure clear water spray. When the rinse phase is finished, all spray arms are returned to their starting positions away from the vehicle, and the clean vehicle drives away.

Figure 3:
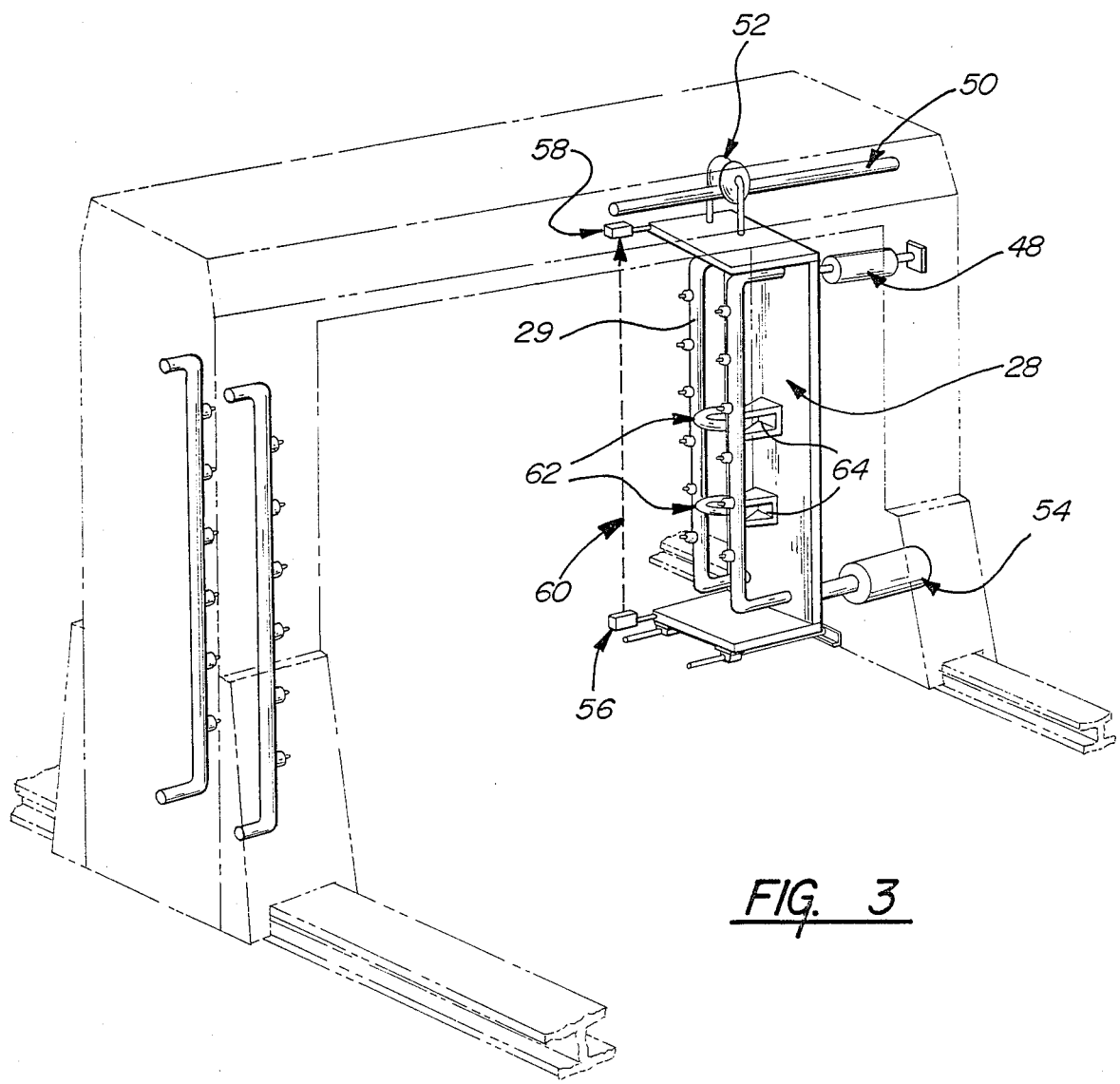
FIG. 3 illustrates the transversely movable spray arm.

Referring now to FIG. 3, the side spray arm system is illustrated in greater detail, particularly movable side spray arm 28. Movable side spray arm 28 moves via track follower 52 on guide rail 50 near the upper end of arm 28. The back and forth movement of spray arm 28 is effected by a pair of hydraulic cylinders 54, which push and pull spray arm 28 toward and away from the side of the vehicle (not shown) over which gantry frame 12 is traveling.

Non-vehicle-contacting sensor means comprising an infrared emitter 56 and receiver 58 are mounted on movable side spray arm 28 spaced vertically apart a distance at least equal to the height of arm 28. Emitter 56 and receiver 58 are mounted forward of both the nozzles 30 and the arm 28 such that a sensor beam 60 generated between emitter 56 and receiver 58 precedes the arm 28, spray tube 29 and nozzles 30 by a distance substantially equal to the distance between fixed spray arm 26 and the opposite side of the vehicle. The side spray arm 28 moves downward the vehicle to wash its side surface, and when the sensor beam 60 is broken by contact with the vehicle, a signal is sent to a microprocessor (not shown), which in turn shuts off or reverses hydraulic cylinders 54. In this manner the movable side spray arm 28 is maintained at a relatively constant predetermined distance from the side of the vehicle, and contact between the arm 28 or nozzles 30 and the vehicle is prevented.

Vehicle-contacting sensor means comprising spring-mounted sensor wheels 62 and limit switches 64 provide a back-up to the sensor beam 60, preventing contact between the arm 28 or nozzles 30 and the side of the vehicle in case of failure of sensor beam 60. Wheels 62 project beyond nozzles 30, but not as far as sensor beam 60, and are spring-biased out of contact with limit switches 64. If a wheel 62 contacts a vehicle surface, it is pressed into limit switch 64, sending a signal to the microprocessor to reverse hydraulic cylinders 64.

Figure 4:
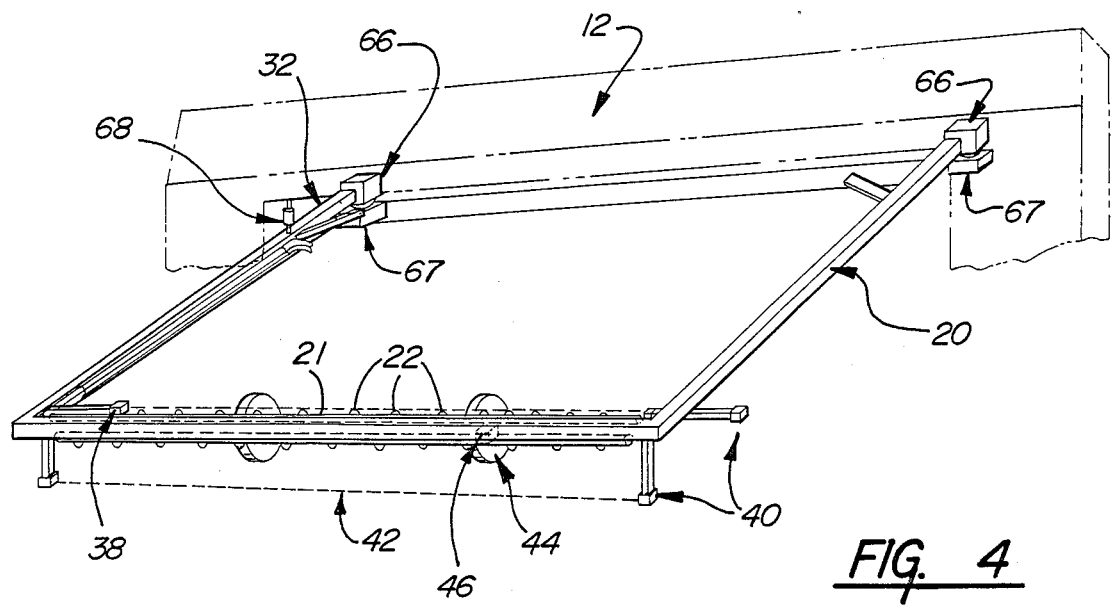
FIG. 4 illustrates a single upper spray arm.

Referring now to FIG. 4, one of the U-shaped spray arms is illustrated in greater detail. Since the U-shaped spray arms 20 and 24 are identical, a detailed description of one is deemed sufficient for purposes of clarity.

One of the U-shaped spray arms 20 is shown pivotally mounted to gantry frame 12 at mounting sites 32. Counterweights 66 are attached to the ends of arm 20 near sites 32, biasing the spray arm to its upper position away from the vehicle (not shown), while rubber bumpers 67 limit the upward motion of spray arm 20. The drive means for the U-shaped spray arm 20 is a hydraulic cylinder 68, disposed between gantry frame 12 and spray arm 20 to vertically displace the arm between its up position away from the vehicle and its down position adjacent the vehicle. Although the spray arm 20 is counterweighted to be biased upward in the event of shut-off or failure of hydraulic cylinder 68, during normal operation the cylinder issued to both raise and lower arm 20.

Hydraulic cylinders 68 are controlled by a microprocessor (not shown) to operate U-shaped spray arms 20 and 24 in a preprogrammed sequence. The U-shaped arms are programmed to go up and down, as the gantry frame 12 travels back and forth, in a seesaw manner such that nozzles 22 generally follow the contour of a vehicle. From a down position in which the nozzles 22 are adjacent one end of the vehicle, the arm travels upwardly in an arc as gantry frame 12 rolls toward the opposite end of the vehicle. As the gantry frame 12 reaches its limit of travel, the arm completes its arc in a raised position with the nozzles 22 adjacent the roof of the vehicle at a point approximately midway along the length of the vehicle. When gantry frame 12 reverses itself, the U-shaped spray arm travels back down through the same arc to its original down position adjacent the end of the vehicle.

The sequence of the U-shaped spray arms can be programmed to virtually any desired pattern to follow the general contour of various types of vehicles. However, since wide variations in size and shape occur among even similar types of vehicles, the U-shaped spray arms of the illustrated roll-over washer 10 are provided with both non-vehicle-contacting and vehicle-contacting sensors to prevent contact between the U-shaped spray arms 20 and 24 and the vehicle.

The non-vehicle-contacting means comprise a plurality of infrared beam emitters 38 and matching receivers 40 mounted on projecting posts 39, which in turn are mounted on each U-shaped spray arm near the lower corners thereof. In one corner two emitters 38 are mounted at right angles to each other. In the other corner, directly opposite emitters 38, two receivers 40 are mounted such that sensor beams 42 generated between emitter beams 38 and receivers 40 are essentially parallel to the transverse nozzle-carrying portion of the U-shaped spray arm.

The sensor beams 42 effectively precede the transverse nozzle-carrying portion of each U-shaped spray arm relative to the vehicle, and when broken by a rise or projection on the vehicle surface signal the microprocessor to increase the rate of rise or upward motion of the U-shaped spray arm. The microprocessor then operates hydraulic cylinders 68 to pull the U-shaped spray arm up out of the path of the obstruction until the sensor beam 42 is restored, preventing contact between the spray arm and the vehicle. In this manner the sensor beam system acts to fine tune or adjust the preprogrammed sequence of operation of the U-shaped spray arms guiding the spray arms over the vehicle surface in close proximity thereto while preventing contact therebetween.

The use of the two sets of emitters 38 and receivers 40 on each U-shaped spray arm, spaced at 90° to each other in the plane of motion of the spray arm, ensures effective coverage regardless of the position of the spray arm relative to the vehicle.

The vehicle-contacting sensor wheels 44 and their accompanying bi-directional limit switches 46, spring-mounted on the nozzle carrying portion of each U-shaped spray arm, are merely back-ups to the sensor beams 42, as it is preferred to avoid all contact with the vehicle surface. Accordingly, the wheels 44 are mounted radially inwardly of sensor beams 42 such that they only contact vehicle 18 in case of failure of the sensor's beams 42 to properly position the U-shaped spray arm. The limit switch 46 is responsive both in compression, for example when the wheel bumps into the windshield of a vehicle, and in tension for example when the wheel catches on a bumper or other projection of the vehicle, to move the U-shaped spray arm or stop the gantry frame to prevent damage to the vehicle.

Figure 5:
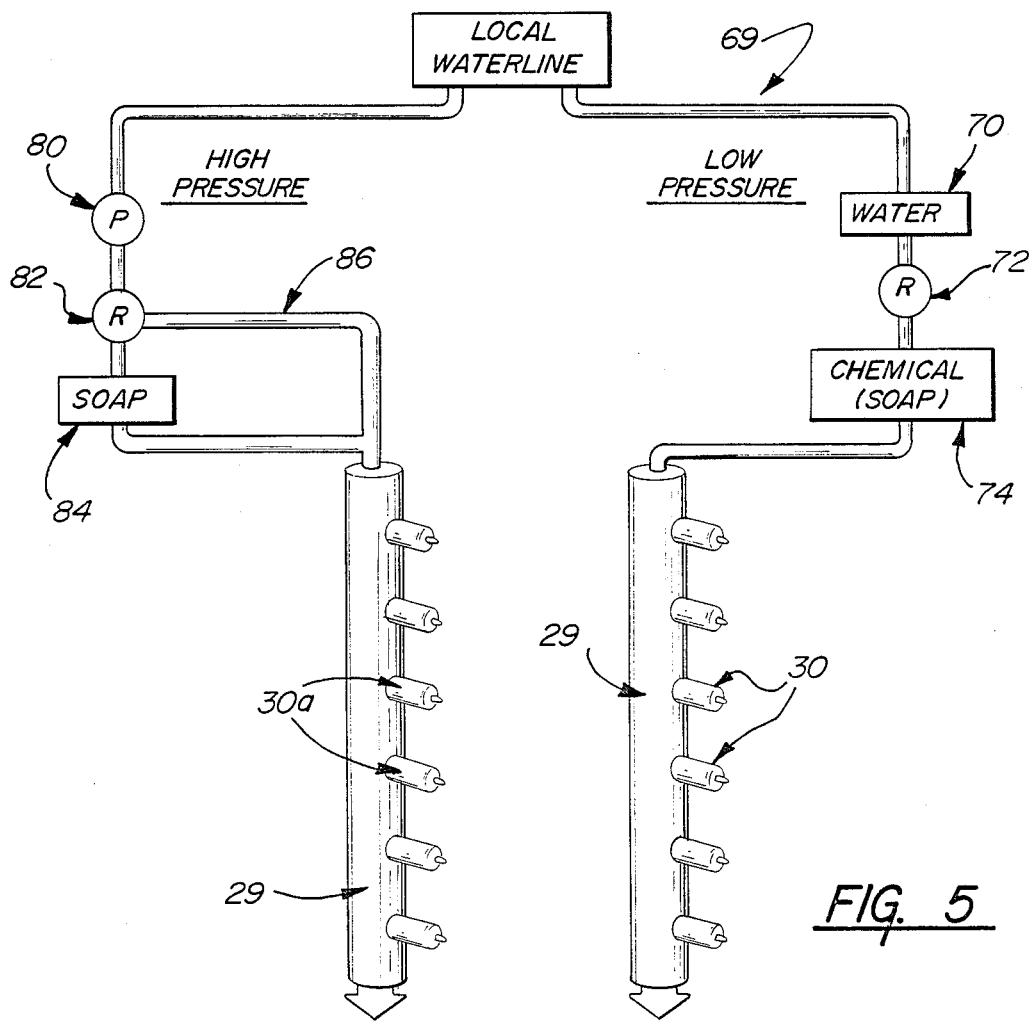
FIG. 5 shows the details of a representative portion of a spray system.

Referring now to FIG. 5, the spray system of each spray arm comprising low and high-pressure systems is illustrated in detail. Essentially the same system is used in both the U-shaped spray arms 20 and 24, in the fixed side spray arm 26, and in the transversely movable side spray arm 28. For simplicity of explanation, only the spray arm of transversely movable side arm 28 will be described.

The low-pressure system generally denoted at 69 comprises a water reservoir 70, a pressure regulator 72, a chemical/soap tank 74, spray tube 29, and low-pressure nozzle 30 all connected in series. This low-pressure system is operated by a microprocessor (not shown) to emit a spray of approximately 40 psi pre-soak solution, via nozzles, 30, onto a vehicle surface during steps A and B of the pre-soak phase (see FIG. 2). The capacity of nozzles 30 is approximately 2.5 gallons per minute. Water is received from local water lines 76 and stored in reservoir 70 until needed, :whereupon it is brought to the correct pressure by regulator 72, mixed with the pre-soak chemical or soap in tank 74, and delivered to spray tube 29 and nozzles 30.

The high pressure system is generally denoted at 78 and comprises a high-pressure pump and reservoir combination 80, pressure regulator 82, a wash line 83 running from regulator 82 through a soap mixing tank 84 to spray tube 21 and nozzles 30A, and a separate rinse line 86 running from regulator 82 straight to spray tube 21 and nozzle 30A. In the high pressure wash phase (Step C in FIG. 2), water from local water line 76 has previously been pumped up to pressure and stored in reservoir 80. It is first delivered through regulator 82 and wash line 83 to soap mixing tank 82 to form a soap solution, and from there to spray tube 21 and nozzles 30A, from which it is emitted as a high-pressure (approximately 750 psi) spray. In the rinse phase (Steps D and E in FIG. 2) the process is the same, except that the water from regulator 82 bypasses soap mixing tank 84 via rinse line 86 so that clear rinse water is emitted from nozzles 30A. High-pressure nozzles 30A in this preferred embodiment operate at a capacity of approximately 70 gallons per minute.

Detailed Operation

Referring now to FIGS. 1–6, a vehicle 18 to be washed is driven underneath gantry frame 12 with the wheels of one side of the vehicle, in this embodiment the left side, in tire guide 34. At this point gantry frame 12 is in a home position with all of its spray arms retracted to their respective up positions furthest from the vehicle 18 as shown in FIG. 6a. When the front vehicle wheel and tire guide 34 contacts treadle 35, the driver is signaled to park the vehicle. This signal may be given by an attendant supervising the operation of the roll-over washer, or it may be an electrical or mechanical audio or visual signal for an automatic or unattended roll-over washer.

With gantry frame 12 resting in a home position mediate front and rear limit switches 36, and the vehicle parked with the plane of the gantry frame 12 extending approximately through its midpoint, the operating sequence of the roll-over washer 10 can begin. As the gantry frame 12 begins to travel rearwardly with respect to the vehicle along tracks 14 and 16, rear U-shaped spray arm 24 is lowered by hydraulic cylinder 68, reaching its fully down position adjacent the rear bumper of the vehicle when the gantry frame reaches rear limit switches 36. This is shown in FIG. 6b. If the size and shape of the vehicle do not permit rear U-shaped spray arm 24 to be completely lowered, sensor beams 42 contact the vehicle, reversing hydraulic cylinder 68 until sensor beams 42 are restored. This prevents contact between the spray arm 24 and the vehicle 18 and maintains the spray arm in close proximity to the surface of the vehicle. During the rearward travel of gantry frame 12, front U-shaped spray arm 20 is maintained in its raised position away from the vehicle 18. Movable side spray arm 28 is moved toward the right side of the vehicle by hydraulic cylinders 54 as gantry frame 12 travels rearwardly, with sensor beam 60 maintaining movable side spray arm 28 a distance from the right side of the vehicle equal to the distance of fixed side spray arm 26 from the left side.

When gantry frame 12 contacts rear limit switches 36, the pre-soak cycle begins. The low-pressure spray systems 69 of all the spray arms are activated to emit a heated pre-soak solution from U-shaped spray arm nozzles 22 and side spray arm nozzles 30. At the same time, gantry frame 12 reverses itself, traveling forward along the tracks 14 and 16 with respect to the vehicle to the position shown in FIG. 6c. Front U-shaped spray arm 20 is lowered and rear U-shaped spray arm 24 is raised, each in its respective pre-programmed arc, to generally follow the contour of the vehicle. Sensor beams 42 prevent contact of the U-shaped spray arms with the vehicle if its contour at any point falls outside the limits of the preprogrammed sequence. When gantry frame 12 reaches forward limit switches 36, shown in FIG. 6d front U-shaped spray arm 20 is in its fully down position adjacent the front bumper of the vehicle, and rear U-shaped spray arm 24 is in its fully raised position adjacent the midpoint of the vehicle. Movable side spray arm 28 is transversely adjusted relative to the movement of the gantry frame 12 with respect to the right side of the vehicle in the same manner.

After as many pre-soak passes as desired are completed, the roll-over washer 10 goes through the wash and rinse phases in a manner substantially identical to that of the pre-soak phase, the only difference being that the high pressure spray system 78 operates in place of the low-pressure spray systems 69. When the roll-over washer 10 has completely finished pre-soaking washing and rinsing the vehicle 18, it returns to its home position mediate limit switches 36, the front and rear U-shaped spray arms 20 and 24 are retracted to their fully raised positions away from the vehicle 18, the movable side spray arm 28 is retracted away from the right side of the vehicle 18, and the cleaned vehicle is driven away. This condition is shown in FIG. 6e.

It is to be understood that the foregoing description of the illustrated embodiment is not intended to be limiting, and that various modifications of the illustrative embodiment lie within the scope of the invention.

We claim:

1. A brushless roll-over washing apparatus for washing stationary vehicles comprising:
   a gantry frame mounted on tracks to move fore and aft over said stationary vehicle;
   a pair of spray arms pivotally mounted to the gantry frame near the top and extending outwardly therefrom in opposite directions;
   a spray system mounted on each of said arms having nozzles for spraying a vehicle;
   drive means for moving said spray arms through respective arcs up and down relative to said stationary vehicle, as said gantry frame moves for and aft, in a predetermined sequence of operation in which said spray arms essentially follow the contour of said vehicle.

2. Apparatus as defined in claim 1, wherein said spray system comprises independent high-and low-pressure spray systems.

3. Apparatus as defined in claim 2, wherein said low-pressure spray system is operable to emit low-pressure pre-soak solution through said nozzles onto the vehicle.

4. Apparatus as defined in claim 2, wherein said high-pressure spray system is operable to emit both a high-pressure soak spray and a high-pressure clear water rinse spray through said nozzles onto the vehicle.

5. Apparatus as defined in claim 1, wherein said drive means comprises at least one hydraulic cylinder for each U-shaped spray arm.

6. Apparatus as defined in claim 1, wherein said predetermined sequence of operation comprises pre-soak, wash, and rinse phases.

7. Apparatus as defined in claim 6, wherein said predetermined sequence of operations is controlled by a microprocessor.

8. Apparatus as defined in claim 1, including means for limiting the fore and aft movement of said gantry frame.

9. Apparatus as defined in claim 8, wherein said means for limiting the fore and aft movement of said gantry frame comprises at least one limit switch.

10. A roll-over high-pressure washer for non-contact washing of stationary vehicles, comprising:
    a gantry frame mounted to move fore and aft over said stationary vehicle;
    a pair of U-shaped spray arms pivotally mounted to the gantry frame near the top and extending outwardly therefrom in opposite directions for washing the upper surfaces of said vehicle;
    a pair of side spray arms mounted to move with said gantry frame for washing the side surfaces of said vehicle;
    sensor means mounted on said U-shaped spray arms to prevent contact between said U-shaped spray arms and said vehicle;
    each of said spray arms having mounted thereon independent high- and low-pressure spray systems having nozzles for spraying said vehicle.

11. Apparatus as defined in claim 10, wherein said sensor means comprises both primary sensor means and secondary sensor means.

12. Apparatus as defined in claim 11, wherein said primary sensor means is non-vehicle-contacting.

13. Apparatus as defined in claim 11, wherein said secondary sensor means is vehicle-contacting.

14. Apparatus as defined in claim 10, wherein one of said side spray arms is transversely movable relative to the fore and aft movement of said gantry frame toward and away from the side surface of said vehicle.

15. A brushless roll-over high-pressure washer for non-contact spray washing of stationary vehicles in a predetermined sequence of pre-soak, wash and rinse phases, comprising:
   an inverted U-shaped gantry frame mounted on tracks to move fore and aft over said stationary vehicle;
   a pair of U-shaped upper spray arms pivotally mounted to the gantry frame near the top and extending outwardly therefrom in opposite directions for washing the upper surfaces of said vehicle;
   programmable drive means for independently moving said U-shaped upper spray arms through respective arcs up and down relative to said stationary vehicle, as said gantry frame moves fore and aft, to maintain said U-shaped spray arms in close proximity to the upper surfaces of said vehicle;
   primary non-contact sensor means mounted on said U-shaped spray arms for preventing contact between said U-shaped upper spray arms and said vehicle as the gantry frame moves fore and aft;
   a fixed side spray arm mounted on said gantry frame for washing the surface of a first side of said vehicle;
   guide means for positioning said vehicle with respect to said gantry frame such that said first side of said vehicle is at a predetermined distance from said fixed side spray arms;
   a movable side spray arm mounted on said gantry frame opposite said fixed side spray arm for washing the surface of the second side of said vehicle, said movable side spray arm adjustable toward and away from said second side of said vehicle to maintain it therefrom at a distance substantially equal to said first predetermined distance;
   primary non-contact sensor means mounted on said movable side spray arm for preventing contact between said movable beside spray arm and said vehicle;
   independent high- and low-pressure spray systems, having nozzles for spraying said vehicle, mounted on each of said U-shaped upper spray arms and on said fixed and movable side spray arms;
   secondary contact sensor means mounted on said U-shaped upper spray arms and said vehicle;
   counterweighting means mounted on said U-shaped upper spray arms to bias said U-shaped upper spray arms upward away from said vehicle.

16. Apparatus as defined in claim 15, wherein said secondary contact sensor means is mounted inwardly of said primary non-contact sensor means relative to said vehicle.

17. Apparatus as defined in claim 16, wherein said primary non-contact sensor means comprises a system of light beam emitters and receivers.

18. Apparatus as defined in claim 17, wherein light beams generated between said beam emitters and receivers are substantially parallel to the transverse portion of said U-shaped spray arm.

19. Apparatus as defined in claim 16, wherein said secondary contact sensor means comprises a spring-mounted sensor wheel and limit switch.

20. Apparatus as defined in claim 19, wherein said limit switch is bi-directional, responding to both tension and compression of said spring-mounted sensor wheel.

21. Apparatus as defined in claim 15, wherein said programmable drive means comprises at least one hydraulic cylinder controlled by a microprocessor.

* * * * *